June 17, 1924.                    1,498,005
R. D. WEBB
COTTON COMPRESS
Filed Jan. 30, 1919
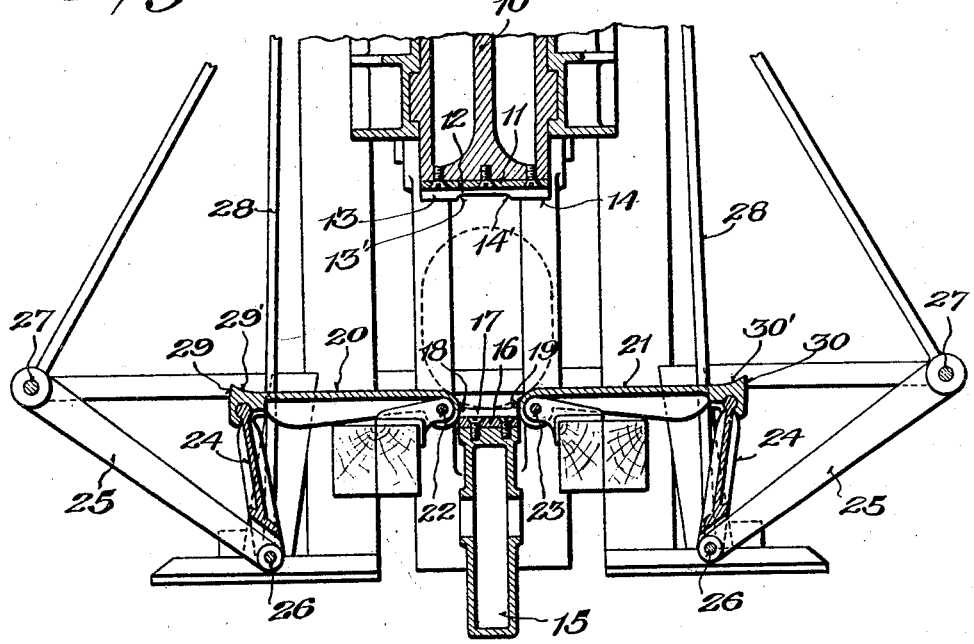
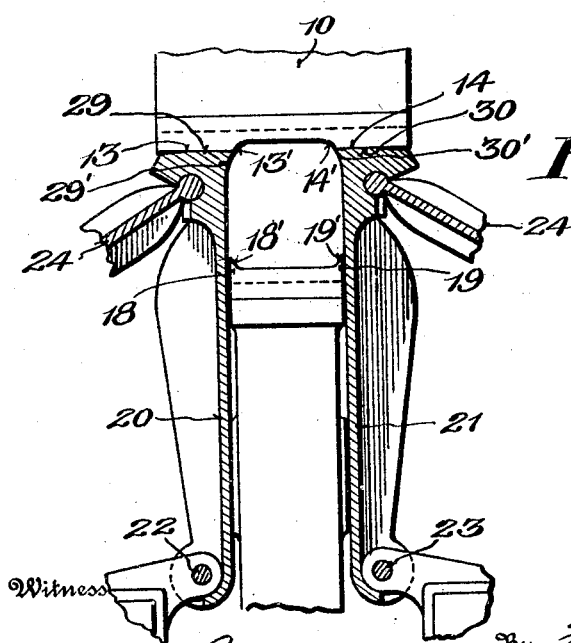
Inventor
Robert D. Webb Patented June 17, 1924.

1,498,005

UNITED STATES PATENT OFFICE.

ROBERT D. WEBB, OF MINDEN, LOUISIANA.

COTTON COMPRESS.

Application filed January 30, 1919. Serial No. 274,026.

*To all whom it may concern:*

Be it known that I, ROBERT D. WEBB, a citizen of the United States, residing at Minden, parish of Webster, State of Louisiana, have invented certain new and useful Improvements in Cotton Compresses, of which the following is a specification.

The present invention relates to cotton compresses of the high density type and more particularly to improvements in this class of machines whereby the bale is shaped so that when banded and removed from the compress the expansion of the bale is very slight.

In one type of compresses the top and bottom of the bale only are acted upon. These machines may be termed low density compresses. In another type of machines, four sides of the bale are acted upon. This type may be termed high density compresses.

Heretofore the bale as compressed in either the high density or low density compresses had sharp corners, and consequently after the bale had been banded and the pressure of the compress removed, the bale expanded enormously even with good tying, as the bands pressed into the bales at these sharp square corners. The expansion occurred in the direction of the compression.

The present invention contemplates the provision of means in high density compresses whereby the above mentioned defect is eliminated. To this end the compress is constructed so that the bale is formed with well rounded corners. Consequently, the bands do not press into the corners, but remain tight, thus preventing a large part of this excessive expansion of the bale, due to the bands pressing into the sharp corners of the same.

The amount of expansion allowed the bale by the bands cutting into the corners will be apparent from the following experiment. If a string thirty inches long is stretched tight, and its ends then moved towards each other only the small amount of one-fourth of an inch at each end, it will be found that this movement produces sufficient slack in the string so that the middle portion thereof may be moved several inches laterally. The portions of the bands on the sides of the compressed bale correspond to this string. When the bands press into the corners, even if only a slight amount, sufficient slack is produced on its two sides so that the compressed bale will expand several inches in the direction of its compression. Even with platens which produce a uniform curvature of the sides of the compressed bale, as the corners are sharp this excessive expansion takes place as the bands press into these sharp corners, when pressure is removed and the bale allowed to expand.

The objects and features of novelty of the invention will be apparent from the description taken in connection with the drawings in which:—

Figure 1 is a sectional elevation of a portion of a high density compress having the present invention embodied therein; and Figure 2 is a sectional elevation illustrating the side doors and platens in their final compression positions.

The features of the present invention are adapted to be incorporated in any of the high density compresses. The compress illustrated in Figure 1 is of the type described and claimed in the patent to S. J. Webb, No. 828,002, but it is to be understood that the invention is not limited to a machine of the exact construction illustrated.

In the operation of the press shown the plantation bale of cotton is disposed on the lower platen so that there is considerable clearance between the top of the bale and the upper platen. Then the bale is reformed by pressure exerted on its sides, thereby reducing the surface of the top and bottom of the bale, to which the compressing pressure is to be applied.

Referring to the drawings the numeral 10 indicates the upper stationary platen which has a plate 11 secured thereto formed with the usual transverse ribs 12. These ribs adjacent their ends are formed with the inward projections 13 and 14 and the interior surfaces 13' and 14' of the projections are curved so that they smoothly join the faces of the ribs.

The lower platen 15 has the usual platen plate 16 formed with the transverse ribs 17. At their ends these ribs have the inward projections 18 and 19, the interior surfaces 18' and 19' of which are curved to smoothly join the faces of the ribs. The platen 15 is mounted for movement toward the upper platen. Any suitable mechanism (not shown) may not be used for this purpose.

For the purpose of acting on the sides of the bale the compress is provided with a pair of pivoted doors 20 and 21. As shown the door 20 is pivoted at its lower edge as at 22 and the door 21 is pivoted at 23. Means is provided for swinging these doors about their pivots toward each other to act on the bale. The mechanism for thus moving the doors may comprise a pair of toggle links 24 and 25. One end of the link 24 is pivoted to the upper portion of a door and the other end is pivoted to the link 25 as at 26, one end of the link 25 being mounted on a fixed pivot 27. A reach rod 28 has its lower end secured to the pivot 26 and when this rod is moved in an upward direction, the toggle links are straightened out thereby swinging the doors on their pivots.

The upper portions of the faces of the doors 20 and 21 are provided with the projections 29 and 30 respectively, the interior surfaces 29' and 30' of which are curved. The curvature of these surfaces is such that they smoothly join the faces of the side doors, and when the doors are in the position shown in Figure 2 form practically smooth continuations of the curved surfaces 13' and 14' of the upper platen plate 11.

In the operation of the compress a bale is placed on the lower platen and the side doors are then swung toward each other to reform the bale making it narrower, the doors assuming the position shown in Figure 2. Thereafter the lower platen is moved toward the upper platen to compress the bale. The curved surfaces on the upper platen and the complementary curved surfaces on the side doors act to form well rounded corners at the top of the bale. In a similar manner the curved surfaces 18' and 19' of the lower platen form rounded corners at the bottom of the bale. Furthermore as the projections 18 and 19 of the lower platen prevent lateral displacement of the layers of cotton immediately adjacent the same, the rubbing action of these layers of cotton on the side doors is eliminated, so that the efficiency of the compress is increased.

Although the invention has been described in connection with a press having side members adapted merely to reform the bale, it is to be understood that the side members might be of the type which exert compression on the bale. Furthermore, while these doors are shown pivoted, it is obvious that they might be mounted in other ways.

Although an embodiment of the invention has been described in detail, it is to be understood that it is not thus limited but includes modifications and changes which come within the scope of the appended claims.

Having thus described the invention what is claimed as new and desired to be secured by Letters Patent is:—

1. In a cotton compress, in combination, a stationary platen, a platen movable to and from the stationary platen, a pair of side doors between which the movable platen operates, said movable platen provided with means to form the bale with a pair of rounded corners, and said side doors and stationary platen having complementary means to round another pair of corners of the bale.

2. In a cotton compress, in combination, a stationary platen, a platen movable to and from the stationary platen, a pair of side doors between which the movable platen operates, said movable platen provided with projections having curved surfaces to form the bale with a pair of rounded corners, said stationary platen and doors also having projections with curved surfaces to round another pair of corners of the bale, the curved surfaces of the doors being substantially smooth continuations of the curved surfaces of the stationary platen.

3. In a cotton compress, in combination, a stationary platen, side doors adapted to occupy a position perpendicular to the platen, the interior surfaces of said doors adjacent the platen being curved toward each other, the adjacent surface of the platen also being curved to form substantially a smooth continuation of the door surfaces, said curved surfaces acting to round the corners of the bale, and a platen movable between said doors to and from the stationary platen, said movable platen provided with projections at a pair of opposite edges formed with curved surfaces to round another pair of corners of the bale.

4. A cotton compress comprising a pair of platens adapted to compress the bale in one direction, a pair of members operative to act on the bale in a direction at right angles to the first mentioned direction, and means rigidly secured to the platens and members to form the bale with rounded corners.

5. A high density cotton compress comprising a pair of platens adapted to compress the bale in one direction and members operative to act on the bale in another direction, said platens and members having their pressing faces shaped to form the bale with rounded corners.

In testimony whereof I affix my signature.

ROBERT D. WEBB.